United States Patent [19]

Weerackody

[11] Patent Number: 5,461,610
[45] Date of Patent: Oct. 24, 1995

[54] PRECODING OF SIGNATURE SEQUENCES FOR CDMA SYSTEMS

[75] Inventor: Vijitha Weerackody, Springfield, N.J.

[73] Assignee: AT&T IPM Corp., Coral Gables, Fla.

[21] Appl. No.: 938,072

[22] Filed: Aug. 31, 1992

[51] Int. Cl.$^6$ ................................................. H04L 27/30
[52] U.S. Cl. .................................... 370/18; 375/206
[58] Field of Search ............................. 370/18, 19, 20, 370/69.1; 375/200, 206, 208–210; 455/103; 371/78

[56] References Cited

U.S. PATENT DOCUMENTS

| | | | |
|---|---|---|---|
| 4,542,515 | 9/1985 | Gutleber | 370/18 |
| 4,601,047 | 7/1986 | Horowitz et al. | 370/18 |
| 4,922,506 | 5/1990 | McCallister et al. | 375/1 |
| 4,930,140 | 5/1990 | Cripps et al. | 370/18 |
| 5,029,180 | 7/1991 | Cowart | 375/1 |
| 5,081,645 | 1/1992 | Resnikoff et al. | 370/19 |
| 5,099,493 | 3/1992 | Zeger et al. | 375/1 |
| 5,170,411 | 12/1992 | Ishigaki | 375/1 |

OTHER PUBLICATIONS

K. S. Gilhousen et al. "On the Capacity of a Cellular CDMA System," IEEE Trans. Veh. Technol., vol. 40, 303–312, May 1991.

J. T. Taylor et al. "Spread Spectrum Technology: A Solution to the Personal Communications Services Frequency Allocation Dilemma," IEEE Commun. Magazine, vol. 29, No. 2, 48–51, Feb. 1991.

D. Horwood and R. Gagliardi, "Signal Design for Digital Multiple Access Communications," IEEE Trans. Commun., 378–383, Mar. 1975.

*Primary Examiner*—Douglas W. Olms
*Assistant Examiner*—Chau T. Nguyen
*Attorney, Agent, or Firm*—Thomas A. Restaino

[57] ABSTRACT

A technique for reducing multiple access interference (MAI) experienced by receivers of transmissions from a transmitter, e.g., a base station, in a direct-sequence code division multiple access communication system, e.g., a cellular radio system, is disclosed. The technique provides for the precoding of user signature sequences for use in spreading information signals to be transmitted. The use of precoded signature sequences significantly reduces the average level of MAI experienced by the receivers. Despreading of received signals by receivers may be accomplished with the original (i.e., non-precoded) signature sequences. Thus, no changes to receivers are required. The technique includes a feature for determining a set of sequences for both transmitter and receiver from a smaller set of orthogonal sequences.

23 Claims, 4 Drawing Sheets

PRECODING OF SIGNATURE SEQUENCES FOR CDMA SYSTEMS

FIELD OF THE INVENTION

The present invention relates generally to the field of Code Division Multiple Access (CDMA) systems, and more particularly to the reduction of multiple access interference (MAI) in such systems, e.g., direct sequence CDMA systems.

BACKGROUND OF THE INVENTION

In digital cellular radio systems, each cell is a local geographic region containing a base station and a plurality of mobile users. Each mobile user communicates directly with a base station only; there is no direct mobile-to-mobile communication. The base station performs, among other things, a relay function allowing a mobile user to communicate with a user in another location. So, for example, the base station provides coupling of a mobile user's transmission to another mobile user in the same cell, to another base station for coupling to a mobile user in another cell, or to an ordinary public switched telephone network. In this way, a mobile user can send and receive information to and from any other addressable user.

Direct Sequence CDMA (DS-CDMA) techniques are attracting widespread attention in the personal communication fields, such as, for example, digital cellular radio. In a DS-CDMA cellular system, both the time and frequency domains may be shared by all users within a cell simultaneously. This simultaneous sharing of time and frequency domains is to be distinguished from time-division and frequency-division multiple access systems, TDMA and FDMA, where multiple user communication is facilitated with use of unique time slots or frequency bands, respectively, for each user.

In DS-CDMA cellular systems, a base station may simultaneously transmit distinct information signals to separate users using a single band of frequencies. Individual information signals simultaneously transmitted in one frequency band may be identified and isolated by each receiving user because of the base station's utilization of unique signature sequences in the transmission of the information signals. Prior to transmission, the base station multiplies each information signal by a signature sequence signal assigned to the user intended to receive the signal. To recover a transmitted signal from among those signals transmitted simultaneously in a frequency band, a receiving mobile user multiplies a received signal (containing all transmitted signals) by its own unique signature sequence signal and integrates the result. By so doing, the user identifies that signal intended for it, as distinct from other signals intended for other users in the cell.

Further details of the DS-CDMA technique in the cellular radio context are presented in K. S. Gilhousen et al., *On the Capacity of a Cellular CDMA System*, Vol. 40 I.E.E.E. Trans. Vehicular Tech. 303–12 (May 1991). In addition, a discussion of the use of DS-CDMA in the personal communications arena is presented in J. T. Taylor and J. K. Omura, *Spread Spectrum Technology: A Solution to the Personal Communications Services Frequency Allocation Dilemma*, Vol. 29, No. 2 I.E.E.E. Communications 48–51 (February 1991).

The ability of a user in a cell to isolate transmitted information signals intended for it (free from interference due to simultaneous transmission to other users) is dependent on the availability of orthogonal signature sequences for all users in the cell. In a given DS-CDMA cellular system with a given bandwidth and a large number of users, it may not be possible to provide a set of signature sequences for all users which are mutually orthogonal to each other. If a completely mutually orthogonal set of signature sequences is not available for all users in the cell, multiple access interference (MAI) results. MAI may be thought of as a type of "cross-talk" interference which results from an inability to completely isolate a desired information signal from all other transmitted signals in the cell.

The MAI seen by a particular user is approximately proportional to the total number of users in the DS-CDMA system. Because increasing the number of users causes an increase in the number of communication errors, the performance of DS-CDMA cellular systems with large numbers of users is essentially limited by the level of MAI.

To reduce MAI in situations where the number of users exceeds the number of available mutually orthogonal signature sequences, conventional DS-CDMA systems have utilized binary signature sequences having "good" cross-correlation properties. This implies signature sequences which are close to being mutually orthogonal. However, for a given system bandwidth, there are only a limited number of binary signature sequences having good cross-correlation properties. This places a certain limit on the number of users (i.e., capacity) of the system. Because the number of users of cellular and personal communication systems is expected to grow rapidly in the next few years, new techniques for increasing the capacity of such systems are in demand.

SUMMARY OF THE INVENTION

The present invention provides a technique for reducing MAI experienced by users receiving transmissions from a transmitter, e.g. a base station, in a DS-CDMA communication system, e.g., cellular radio system. The technique involves the precoding of user signature sequences for use in spreading information signals at the base station. The use of precoded signature sequences significantly reduces the average level of MAI experienced by the receivers. Despreading of received signals by receivers may be accomplished with the original (i.e., non-precoded) signature sequences. Thus, no changes to the receivers are required. Since the level of MAI is a factor limiting the number of users in a DS-CDMA system, the present invention allows an increase in the number of users in a DS-CDMA system.

Illustrative of the present invention is a direct-sequence code division multiple access transmitter. The transmitter transmits to a plurality of receivers a signal reflecting a plurality of information signals. The transmitter includes one or more means for applying a signature sequence signal to an information signal to form a first signal, a means for combining a plurality of first signals to form a second signal, and a means for transmitting a signal reflecting the second signal. The transmitter further includes a plurality of means, each coupled to a means for applying a signature sequence, for applying a scale factor to the first signal.

The signature sequence signals applied to information signals are based on an error function which reflects correlations between the signature sequence signals and signature sequence signals used by receivers to receive information signals. The signature sequence signals for application to information signals realize an error criterion, such as, e.g., the substantial minimization of the error function.

The correlations may comprise weighted sums of correlations of signature sequence signals used by receivers to receive information signals. The signature sequence signals for application to information signals and the signature sequence signals used by receivers may be based on a set of orthogonal sequence signals, wherein the number of orthogonal sequence signals is less than either the number of signature sequence signals for application to information signals or the signature sequence signals used by receivers.

DETAILED DESCRIPTION

A. Introduction

For clarity of explanation, the illustrative embodiments of the present invention are presented as comprising individual functional blocks (including functional blocks labeled as "processors"). The functions these blocks represent may be provided through the use of either shared or dedicated hardware, including, but not limited to, hardware capable of executing software. (Use of the term "processor" should not be construed to refer exclusively to hardware capable of executing software.) Illustrative embodiments may comprise digital signal processor (DSP) hardware, such as the AT&T DSP16 or DSP32C, and software performing the operations discussed below. Very large scale integration (VLSI) hardware embodiments of the present invention, as well as hybrid DSP/VLSI embodiments, may also be provided.

Figure 1:
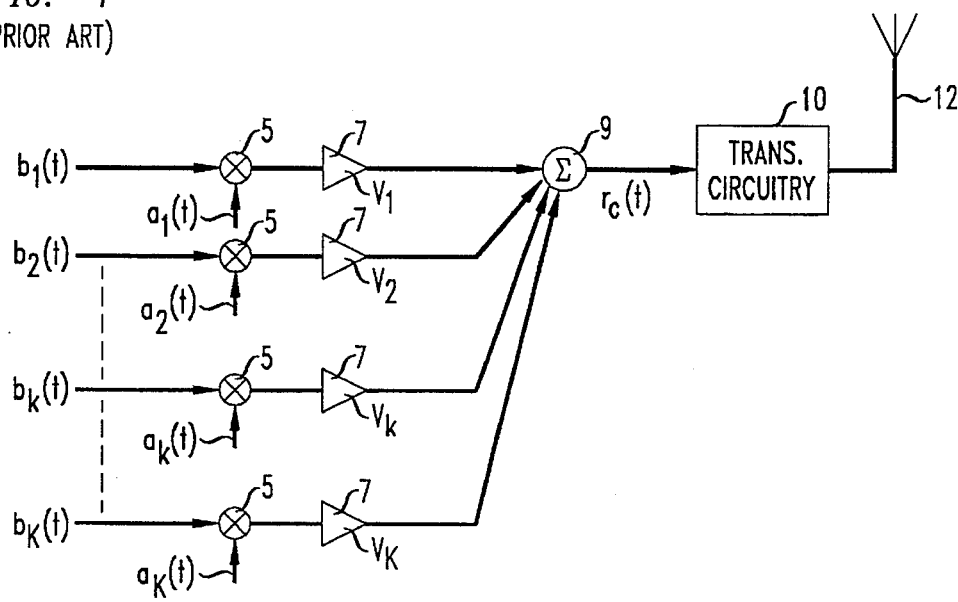
FIG. 1 presents an illustrative prior art DS-CDMA base station system for transmitting information signals to mobile users within a cell.

FIG. 1 presents an illustrative prior art DS-CDMA base station system for transmitting information signals, $b_k(t)$, $1 \leq k \leq K$, to K mobile users. Base stations in DS-CDMA cellular systems employ a unique signature sequence for each mobile unit to which they transmit information signals. As shown in the figure, each information signal, $b_k(t)$, is multiplied by a signature sequence signal, $a_k(t)$, by operation of multiplier circuit 5. The product of these quantities, $b_k(t)a_k(t)$, is provided to amplifier 7 which applies a scale factor, $V_k$. Each of the scaled products for the K signals is summed into a combined signal for transmission. This combined signal is processed by conventional transmission circuitry 10 (e.g., modulation, power amplification) and transmitted via antenna 12 to each of the K users of the cell.

Figure 2:
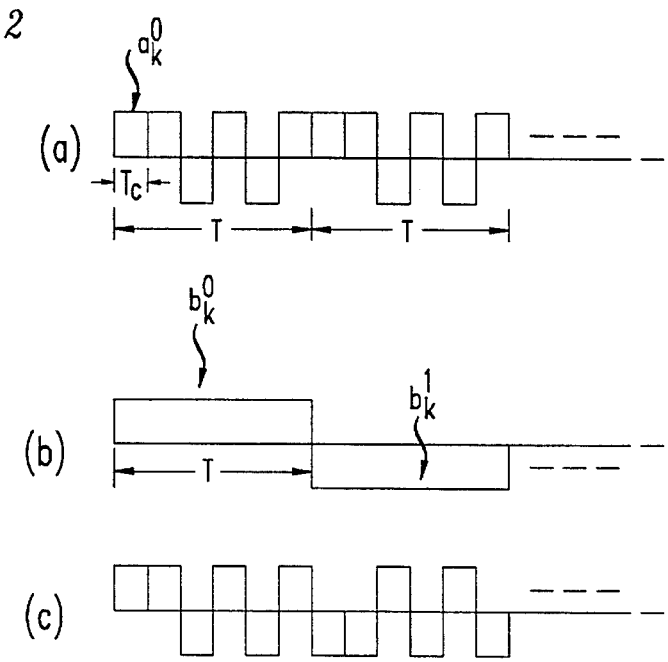
FIG. 2 presents an illustrative signature sequence for use in DS-CDMA transmission, an illustrative information signal for transmission by a DS-CDMA base station transmitter and the product of the two signals.

As shown in FIG. 2a, a signature sequence, $a_k(t)$, where k specifies a particular mobile user, takes the form of a series of positive and negative rectangular pulses. Each rectangular pulse (or chip) is of duration $T_c$ and of magnitude ±1. The signature sequence, $a_k(t)$, is related to a sequence of signature bits or symbols, $a_k^n$, as follows:

$$a_k(t) = \sum_n a_k^n P_{T_c}(t - nT_c), \quad (1)$$

where $P_{T_c}(t)$ is a rectangular pulse of unit amplitude in the time interval $[0, T_c]$, and n specifies the n th data symbol of the sequence.

Typically, there are more than 100 pulses of a signature sequence for each information signal bit to be transmitted. Consequently, the application of a signature sequence to an information signal by multipliers 5 increases the bandwidth of the transmitted signal by more than 100 times. Because of this increase in bandwidth, the multiplication is referred to as signal spreading (because of signal spreading, DS-CDMA falls into a class of radio transmission techniques referred to as spread spectrum communications).

FIG. 2b presents an illustrative information signal, $b_k(t)$, for transmission by the base station of FIG. 1. Signal $b_k(t)$ takes the form of a series of rectangular pulses. Each such pulse is of duration T and amplitude ±1. The ratio of $T/T_c$ is N. The information signal, $b_k(t)$, is related to a sequence of information bits (or symbols), $b_k^n$, as follows:

$$b_k(t) = \sum_n b_k^n P_T(t - nT), \quad (2)$$

where $P_T(t)$ is a rectangular pulse of unit amplitude in the time interval $[0,T]$, and n specifies the n th data symbol of the sequence. FIG. 2b presents a signal based on two information bits, indicated as $b_k^0$ and $b_k^1$.

An illustrative transmitted signal produced by the base station (where the base station is transmitting to but one mobile unit) is presented in FIG. 2c (no carrier signal is shown for the sake of clarity). As may be seen from the Figure, the transmitted signal is the product of the information signal presented in FIG. 2b and the signature sequence of FIG. 2a. Since the sequence of illustrative information signal bits ($b_k^0$, $b_k^1$) are +1 followed by −1, the transmitted signal appears as the signature sequence of FIG. 2a (which lasts for T seconds), followed by the negative of that sequence.

The transmitted signal from the base station (for all users) may be expressed as:

$$r(t) = \sum_{k=1}^{K} V_k a_k(t - \tau_k) b_k(t - \tau_k), \quad (3)$$

where $\tau_k$ is the transmission delay associated with each user within the interval $[0,T]$. Transmission delays may be eliminated at the base station such that $\tau_k=0$ for $1 \leq k \leq K$. DS-CDMA systems which have no such delays are referred to as synchronous. The elimination of delay is a conventional technique well known in the art. In asynchronous DS-CDMA systems, delays $\tau_c$ are random quantities.

Figure 3:
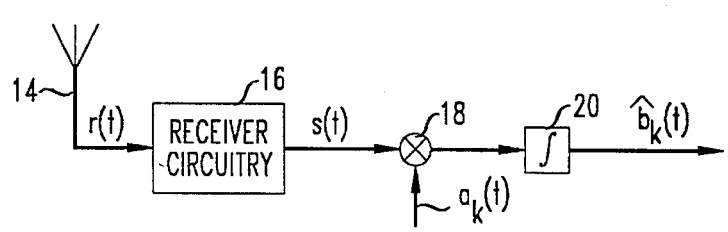
FIG. 3 presents an illustrative prior art DS-CDMA mobile unit receiver.

FIG. 3 presents an illustrative prior art DS-CDMA mobile unit receiver. DS-CDMA signals transmitted by the base station are received by antenna 14 and receiver circuitry 16. The output of receiver circuitry 16, s(t), comprises all signals contemporaneously transmitted by the base station for all users. The receiver identifies a signal intended for it by first multiplying signal s(t) by the signature sequence associated with that user, $a_k(t)$. This multiplication is carded out by circuit 18. Then, the resulting signal, $s(t)a_k(t)$, is integrated by integrator 20 to yield a received information signal for that user $\hat{b}_k(t)$. Signal $\hat{b}_k(t)$ is not equal to $b_k(t)$ due to the presence of MAI and Gaussian noise.

Figure 4:
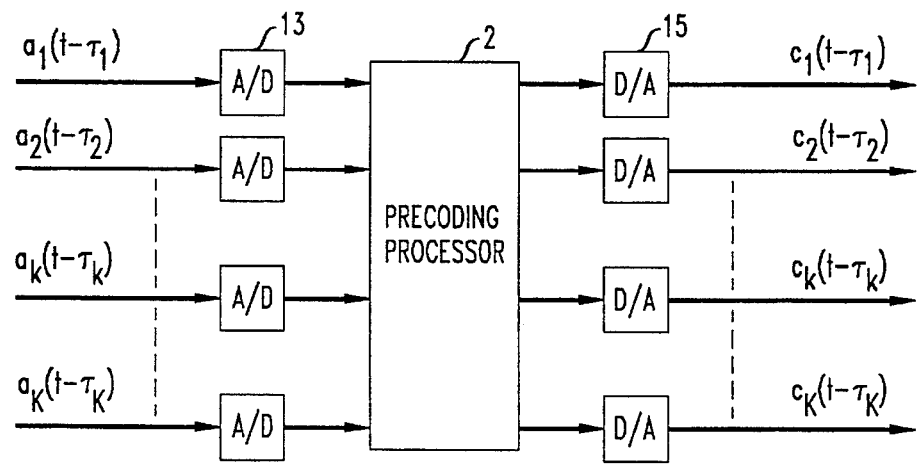
FIG. 4 presents a precoding arrangement in relation to conventional and modified signature sequence signals.

According to the present invention, a set of signature sequences ordinarily used in DS-CDMA transmission by the base station, $a_k(t)$, $1 \leq k \leq K$, are modified by a precoding processor 2 such that the MAI experienced by mobile users is reduced, e.g., minimized. As shown in FIG. 4, the modified signature sequences are designated $c_k(t)$, $1 \leq k \leq K$, and are based on the original signature sequences $a_k(t)$, $1 \leq k \leq K$. Receivers of transmitted signals from a base station which employed modified signature sequences in transmission use the ordinary sequences $a_k(t)$ to despread received signals.

Preferably, the modified signature sequences, $c_k(t)$, are chosen such that the bandwidth and average transmitted power required by the base station is not changed due to the use of modified signature sequences, $c_k(t)$.

In the discussion of the embodiments which follows, the term "sequence" is used to refer to signals which are continuous time functions, e.g., $c_k(t)$. The term "sequence symbols" is used to refer to signals which are discrete functions of time, e.g., $c_k^n$. Nevertheless, both are real "signals" in the sense of analog and digital signals, respectively. So, for example, signal $c_k(t)$ may be generated by a digital-to-analog conversion of signal $c_k^n$.

B. An Illustrative Embodiment

Figure 5:
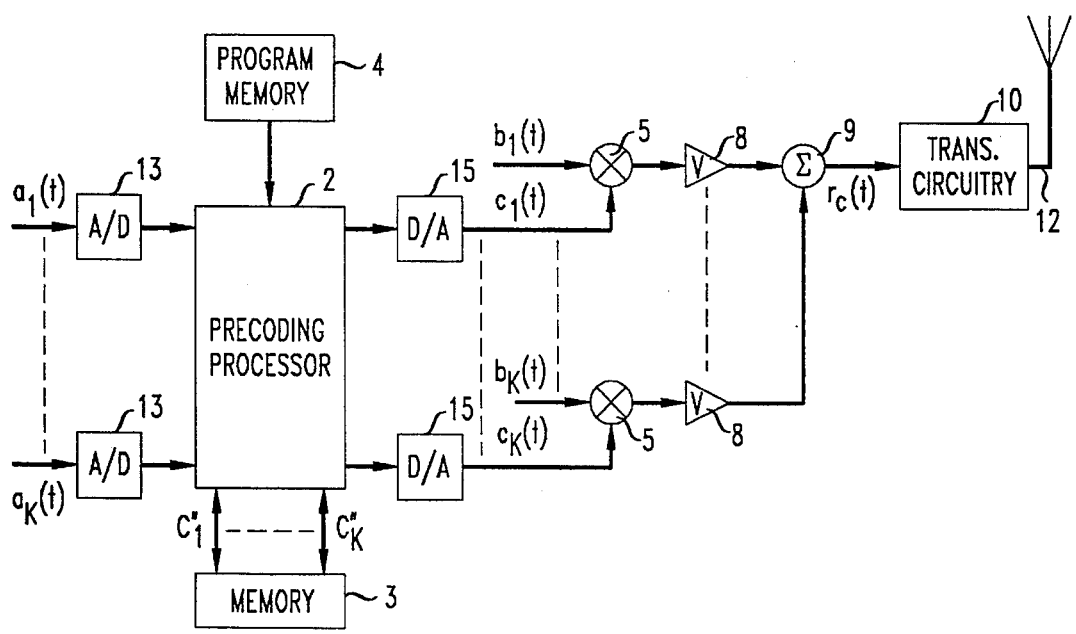
FIG. 5 presents an illustrative embodiment of the present invention.

An illustrative embodiment of the present invention for a synchronous system is presented in FIG. 5. This embodiment is similar to that of FIG. 1, but employs a modified scale factor V and precoded signature sequences $c_k(t)$. The embodiment transmits a signal $r_c(t)$:

$$r_c(t) = \sum_{k=1}^{K} Cc_k(t)b_k(t). \tag{4}$$

In (4), scale factor V is determined such that the average transmitted power is the same as that of the conventional system of FIG. 1 using sequences $a_k(t)$:

$$V = \sqrt{\frac{2\sum_{k=1}^{K} V_k^2}{\lim_{\tau \to \infty} \frac{1}{\tau} \sum_{k=1}^{K} \int_{-\tau}^{\tau} c_k^2(t)dt}}, \tag{5}$$

where $V_k$ are the conventional scale factors associated with the conventional signature sequences, $a_k(t)$.

In determining sequences $c_k(t)$ from sequences $a_k(t)$ for use with the illustrative embodiment of the present invention, an error function which relates $c_k(t)$ and $a_k(t)$ is specified. Given $a_k(t)$, $c_k(t)$ may be chosen such that an error criterion is satisfied. As discussed below, the error criterion for the illustrative embodiments is the minimum error; other criteria may be used as well.

Illustratively, one of two error functions may be used in determining $c_k(t)$. The first of these, $\epsilon'$, concerns the selection of sequences $c_k(t)$ such that MAI signal energy experienced by all K users is minimized. Function $\epsilon'$ may be expressed in the general asynchronous case as:

$$\epsilon' = \sum_{k=1}^{K} \epsilon_k', \tag{6}$$

where $$\epsilon_k' = [r_{kk}(nT + \tau_k, nT + T + \tau_k) - 1]^2 + \tag{7}$$

$$\sum_{\substack{i \in I_1 \\ i \neq k}} [r_{ik}^2(nT + \tau_k, nT + \tau_i) + r_{ik}^2(nT + \tau_i, nT + T + \tau_k)] +$$

$$\sum_{\substack{i \in I_2 \\ i \neq k}} [r_{ik}^2(nT + \tau_k, nT + T + \tau_i) + r_{ik}^2(nT + T + \tau_i, nT + T + \tau_k)]$$

where the sets $I_1$ and $I_2$ are defined as $i \in I_1$, $\tau_i \geq \tau_k$, and $i \in I_2$, $\tau_i < \tau_k$, and $$r_{ik}(t_1, t_2) = \int_{t_1}^{t_2} c_i(t - \tau_i)a_k(t - \tau_k)dt. \tag{8}$$

Note that the conditions necessary to eliminate MAI are $$r_{kk}(nT + \tau_k, nT + T + \tau_k) = 1; \; r_{ik}(nT + \tau_k, nT + \tau_i) = 0,$$

$$r_{ik}(nT + \tau_i, nT + T + \tau_k) = 0, \; i \in I_1, \; i \neq k; \text{ and}$$

$$r_{ik}(nT + \tau_k, nT + T + \tau_i) = 0,$$

$$r_{ik}(nT + T + \tau_i, nT + T + \tau_k) = 0, \; i \in I_2, \; i \neq k.$$

Expression (8) is a partial cross-correlation between $c_i(t)$ and $a_k(t)$. Expression (7) represents the error function for the k th user (where the first term on the right hand side of the expression is the squared difference between unity and the cross-correlation between the k th user signature sequence, $a_k(t)$, and its modified version, $c_k(t)$; the remaining two terms on the right side represent the MAI noise power for the k th user). Signature sequences $c_k(t)$ may be selected as those sequences which minimize $\epsilon'$.

The second of these error functions, $\epsilon''$, concerns the selection of sequences $c_k(t)$ such that $\epsilon'$ is minimized while the transmitted signal amplitude is maximized.

$$\epsilon'' = \sum_{k=1}^{K} \epsilon_k' + \lambda \frac{P_c}{V^2}, \tag{9}$$

where $$\frac{P_c}{V^2} = \lim_{\tau \to \infty} \frac{1}{4\tau} \sum_{k=1}^{K} \int_{-\tau}^{\tau} c_k^2(t - \tau_i)dt \tag{10}$$

and $\lambda$ is a small positive number, e.g. $\lambda = 1.0$, and $P_c$ is the average transmitted power of the system using the modified sequences (which is constant). The first term on the right-hand side of expression (9) is the same as that of expression (6) for the first error function.

In some cases, use of the first error function, $\epsilon'$, to obtain sequences $c_k(t)$, to minimize the level of MAI may also minimize the amplitude of the desired signal at the mobile user. In such cases, background Gaussian noise, which is ordinarily a less significant source of noise when MAI is present, may deteriorate system performance due to reduced desired signal level. The second error function, $\epsilon''$, therefore seeks reduction of MAI without minimization of the desired signal. As such, the illustrative embodiment incorporates the second function, $\epsilon''$.

The conditions necessary to eliminate MAI in synchronous DS-CDMA systems using sequences $c_i(t)$ at the base station and $a_k(t)$ at the user may be expressed as:

$$\int_{nT}^{nT+T} c_i(t) a_k(t) dt = \delta_{ik}, \quad (11)$$

for $i=1,2,\ldots,K$, where $\delta_{ik}=1$ when $i=k$, and $\delta_{ik}=0$ when $i\neq k$; and n is an integer time index. These conditions may be expressed with discrete signals as $$T_c \sum_{l=0}^{N-1} c_i^{n+l} a_k^{n+l} = \delta_{ik}, \quad (12)$$

or in matrix form as $$AC_i = I_i, \quad i=1,2,\ldots K. \quad (13)$$

A is a matrix of dimension K×N whose kl th element is $a_k^{n+l-1}$. Each row of A is the conventional signature sequence symbols $a_k^n(t)$ of the k th user. $C_i$ is a column vector of modified signature symbols for the i th user such that $C_i^T = [c_i^n, c_i^{n+1}, \ldots c_i^{n+N-1}]$. $I_i$ is a column vector having a value $$\frac{1}{T_c}$$

at its i th position and zero elsewhere.

Expression (13) is a specific case of a more general expression:

$$V_i = AC_i - I_i, \quad (14)$$

where $V_i$ is an error vector which equals zero when MAI is eliminated and which is non-zero when MAI is not eliminated. Expression (14) may be used to rewrite general expression (9) for the synchronous case as:

$$\epsilon'' = \sum_{i=1}^{K} \|V_i\|^2 + \frac{\lambda}{2N} \sum_{i=1}^{K} \|C_i\|^2 \quad (15)$$

where $\|\cdot\|$ specifies the $L_2$-norm. The total average error from (15), $\epsilon''$, may be minimized by considering the modified sequence of signature symbols for each user individually. Expression (15) is rewritten on a per user basis as $$\epsilon_i'' = (AC_i - I_i)^T(AC_i - I_i) + \frac{\lambda}{2N} C_i^T C_i, \quad (16)$$

for $i=1,2,\ldots,K$. The vector $C_i$ which minimizes $\epsilon_i''$ is $$C_i'' = \left( A^T A + \frac{\lambda}{2N} I \right)^{-1} A^T I_i, \quad (17)$$

where I is an N×N identity matrix, and $C_i''$ is a column vector of the form described above. In determining sequences $C_i''$, no constraints need be placed on the value of modified sequence symbols.

Since A and $I_i$ are known, modified code sequences, $C_i''$, may be determined for use by the base station transmitter for each user in a cell. The term $$\left( A^T A + \frac{\lambda}{2N} I \right)^{-1}$$

need be determined once for all users in the cell. Only term $A^T I_i$ varies from user to user, as indicated by the subscript i.

Sequences of signature symbols determined with expression (17) are used to provide signature sequences $c_k(t)$ according to the relationship of expression (1), rewritten as:

$$c_k(t) = \sum_n c_k^n 1 P_{T_c}(t - nT_c), \quad (18)$$

where k is used in place of i in $c_i^n$ and $P_{T_c}(t)$ is a rectangular pulse of unit amplitude in the time interval $[0,T_c]$.

Figure 8:
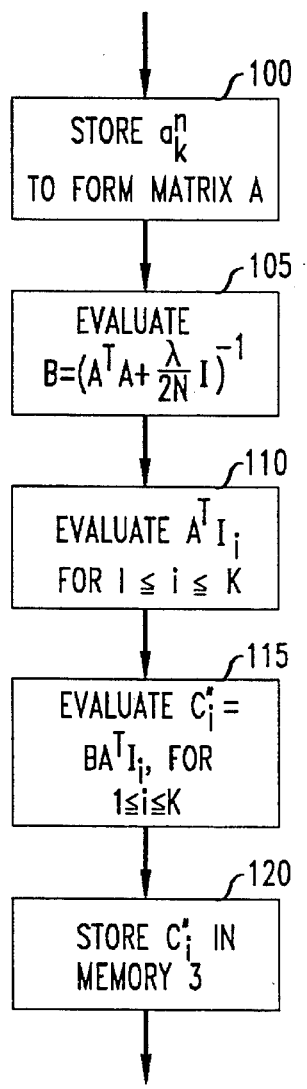
FIG. 8 presents a flow diagram of the operation of a processor in providing precoded signature sequence symbols according to the first illustrative embodiment.

The embodiment of FIG. 5 comprises analog-to-digital (A/D) converter circuitry 13 which receives sequences $a_k(t)$ and provides symbols $a_k^n$ to a precoding processor 2. Processor 2 determines modified signature sequence symbols $c_k^n$ and provides them to a memory 3 for storage. These modified signature sequence symbols are retrieved from memory 3 by processor 2 and provided to digital-to-analog (D/A) converters 15 which provide modified signature sequences, $c_k(t)$, to the multipliers 5. As referenced above, processor 2 may be realized as a digital signal processor, e.g., the AT&T DSP32C, programmed to operate as described below. Software for execution by processor 2 are stored in program memory 4 and are presented in block-flow form in FIGS. 8 and 9. Memories 3 and 4 may be realized with any suitable memory medium such as conventional semiconductor random access and read-only memory, respectively. The A/D and D/A converters 13,15 are conventional within the art.

Precoding processor 2 receives as input signals representing the K conventional signature sequence symbols $a_k^n$, $n=1,2,3\ldots$, from A/D converters 13. The signature sequence symbols for all K users are used by processor 2 to form matrix A, as described above (see FIG. 8, step 100). Matrix A may be stored in memory 3.

Processor 2 then evaluates Expression (17) for each of the K users. It does this by evaluating the matrix $$B = \left( A^T A + \frac{\lambda}{2N} I \right)^{-1},$$

which is common to the evaluation of (17) for all users (see step 105). Matrix B may be stored in memory 3. Once matrix B is evaluated, a vector, $C_i''$, comprising the sequence of modified signature sequence symbols for each user is evaluated. This is done by multiplying matrix B by the vector $A^T I_i$, where the subscript i represents the i th user, $1 \leq i \leq K$ (see steps 110 and 115). Vectors of modified signature sequence symbols, $C_i''$, are stored in memory 3 (see step 120).

Figure 9:
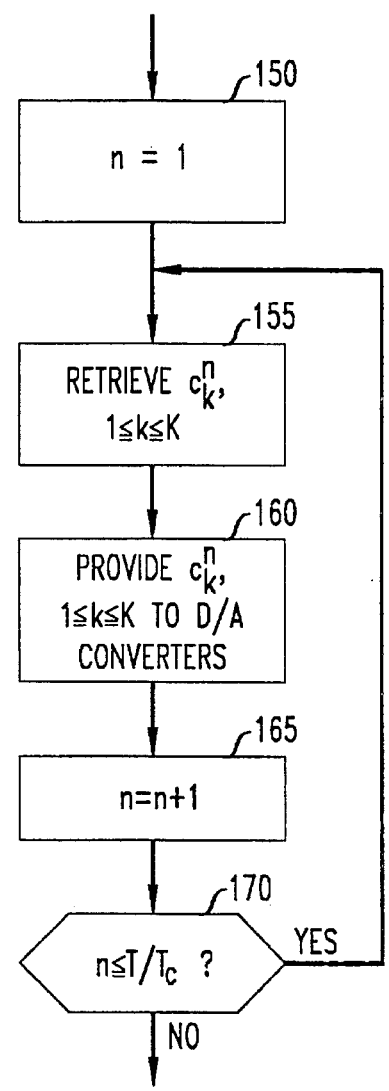
FIG. 9 presents a flow diagram of the operation of a processor in providing signature sequence symbols for use by a DS-CDMA base station in signal spreading according to the first illustrative embodiment.

These sequence symbols may then be retrieved as needed by processor 2 to provide to multipliers 5 modified signature sequences, $c_k(t)$. This is done, as shown in FIG. 9, by retrieving symbols $c_k^n$ for all k at a given time n (see Step 155). These symbols are supplied to D/A converters 13 simultaneously for the generation of sequences $c_k(t)$ (see step 160). The D/A converters 13 realize the expression (18). Symbols $c_k^n$ are retrieved at each time value n for the duration of the symbols, $N=T/T_c$ (see steps 165 and 170).

The outputs of the multipliers 5 are provided to gain processors 8 which apply gain V according to expression (5).

The outputs of gain processors 8 are summed in the conventional fashion by summing circuit 9. The sum signal, $r_c(t)$, is then processed by transmission circuit 10 and transmitted to users with use of antenna 12.

Once the modified signature sequence symbols are evaluated and stored in memory 3, they need not be evaluated again. That is, for a given user, the same modified sequence symbols may be employed for each information bit to be transmitted.

In the illustrative embodiment described above, the signature sequences are periodic signals with period T, the duration of a data bit signal. However, the present invention is also applicable to situations where a signature sequence is aperiodic or has a period greater than T, e.g., an integral multiple of T.

Figure 6:
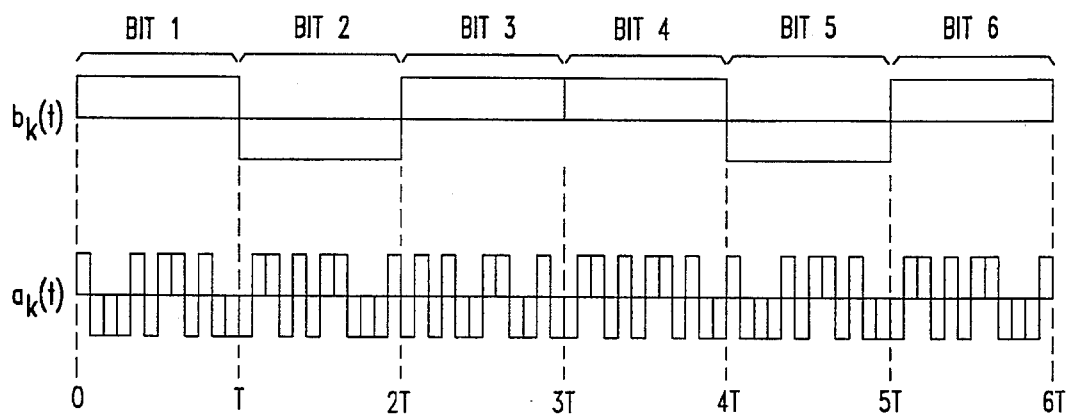
FIG. 6 presents a signature sequence having a period longer than one data bit for use in precoding according to the principles of the present invention.

For example, FIG. 6 presents an information signal, $b_k(t)$, reflecting six consecutive data bits for transmission to the k th user by a base station. The rectangular pulses which represent each bit are each of duration T. The Figure also presents a signature sequence signal, $a_k(t)$, which has a period of 4T. In order to determine a modified signature sequence, $c_k(t)$, according to the invention for use in transmitting $b_k(t)$, all that need be done is to treat each interval of $a_k(t)$ of duration T as though it were a signature sequence signal with period T. So, for example, in transmitting bit 1 of $b_k(t)$ of FIG. 6, the sequence $a_k(t)$ over the interval (0,T] is precoded, as described above, to provide a modified signature sequence $c_k(t)$ for the interval (0,T]. This sequence is used as described above to multiply the portion of $b_k(t)$ reflecting bit 1. In transmitting bit 2 of $b_k(t)$, the sequence $a_k(t)$ over the interval (T,2T] is precoded to provide a modified signature sequence $c_k(t)$ for the interval (T,2T]. This modified signature sequence is used as described above for multiplying the portion of $b_k(T)$ reflecting bit 2. This process is repeated for the remaining two intervals of duration T in one period (i.e., 4T) of $a_k(t)$.

In transmitting bit 5 of $b_k(t)$, the modified signature sequence determined for use with bit 1 may be reused. This is the result of the periodicity of $a_k(t)$. Bit 6 of $b_k(t)$ may be transmitted with the modified signature sequence determined for use with bit 2, and so on. Modified signature sequences which may be needed for subsequent data bits may be stored if sufficient memory is available. Otherwise, such sequences may be computed as needed.

The illustrative embodiment of the present invention discussed above may be provided based upon $\epsilon'$ rather than $\epsilon''$. In such a case, expression (14) may be used to rewrite expression (6) as $$\epsilon' = \sum_{i=1}^{K} \|V_i\|^2. \tag{19}$$

The vector $C_i$ which minimizes $\epsilon'$ is given by $$C_i' = A^\# I_i \tag{20}$$

where $i=1,2,\ldots K$ and where $A^\#$ is the pseudoinverse of matrix A. Matrix $A^\#$ is given by $$A^\# = X \begin{bmatrix} \Sigma^{-1} & 0 \\ 0 & 0 \end{bmatrix} Y^T. \tag{21}$$

X and Y are N×N and K×K unitary matrices, respectively, and $\Sigma^{-1}$ is a W×W diagonal matrix with elements $$\Sigma^{-1} = \text{diag}[\sigma_1^{-1}, \sigma_2^{-1}, \ldots, \sigma_W^{-1}], \tag{22}$$

where W is the rank of matrix A and $\sigma_1, \sigma_2, \ldots, \sigma_W$ are eigenvalues of A. Matrices X, Y, $\Sigma^{-1}$, and A are related by the singular value decomposition of A:

$$Y^T A X = \begin{bmatrix} \Sigma & 0 \\ 0 & 0 \end{bmatrix}, \tag{23}$$

where X,Y, and $\Sigma$ are given by the singular value decomposition of A.

An alternative to the embodiments discussed above concerns an asynchronous DS-CDMA system. In such a system, a modified signature sequence for the i th user may be expressed as a weighted sum of conventional signature sequences:

$$c_i(t - \tau_i) = \sum_{m=1}^{M} w_{im} a_{l_{im}}(t - \tau_{l_{im}}) \tag{24}$$

where $l_{im}$, $m=1,2,\ldots,M$, is a set of integers which includes the integer i, and $w_{im}$ are elements of weight vectors, $W_i$.

The weight vectors to be used are those which satisfy the error function $\epsilon''$. Given an error vector $V_i$:

$$V_i = A_i W_i - e_i \tag{25}$$

for $i=1,2,\ldots,K$, where $e_i$ is a (2K−1) dimensional unit vector with unity at its (2i−1) th position and zero elsewhere, and $A_i$ is:

$$[A_i]_{(2k-1)m} = \int_{\tau_k}^{\tau} a_{l_{im}}(t - \tau_{l_{im}}) a_k(t - \tau_k) dt$$

$$[A_i]_{(2k)m} = \int_{\tau}^{T+\tau_k} a_{l_{im}}(t - \tau_{l_{im}}) a_k(t - \tau_k) dt \quad k < i$$

$$[A_i]_{(2k-1)m} = \int_{\tau_k}^{T+\tau_k} a_{l_{im}}(t - \tau_{l_{im}}) a_k(t - \tau_k) dt \quad k = i$$

$$[A_i]_{(2k-2)m} = \int_{\tau_k}^{\tau} a_{l_{im}}(t - \tau_{l_{im}}) a_k(t - \tau_k) dt$$

$$[A_i]_{(2k-1)m} = \int_{\tau}^{T+\tau_k} a_{l_{im}}(t - \tau_{l_{im}}) a_k(t - \tau_k) dt \quad k > i \tag{26}$$

where $k=1,2,\ldots K$; $i=1,2,\ldots K$; $\tau_{l_{im}}$ for $\tau_{l_{im}} < \tau_k$, $\tau = \tau_{l_{im}}$ for $\tau_{l_{im}} \geq \tau_k$, then the error function $\epsilon''$ is:

$$\epsilon'' = \sum_{i=1}^{K} \|V_i\|^2 + \lambda \sum_{i=1}^{K} W_i^T R_i W_i. \tag{27}$$

Note that the elements of $A_i$ may be derived by substituting (24) into (8) and factoring out the weights as shown in (25). For the i th user, expression (27) may be rewritten as $$\epsilon_i'' = (A_i W_i - e_i)^T (A_i W_i - e_i) + \lambda W_i^T R_i W_i. \tag{28}$$

The weight vectors, $W_i$, which minimize $\epsilon_i''$ are given by:

$$W_i = (A_i^T A_i + \lambda R_i)^{-1} A_i^T e_i, \tag{29}$$

for $i=1,2,\ldots K$.

In this embodiment, the precoding processor would provide modified signature sequences by evaluating expression (29) for weight vectors and by applying the weights in expression (24). All delays $\tau_i$ are available at the base station for use by the precoding processor.

The error function $\epsilon'$ may also be used in an asynchronous embodiment. In this case the weight vector which minimizes $\epsilon'$ is given by:

$$W_i' = A_i^{\#} e_i, \tag{30}$$

for i=1,2, ... K, where $A_i^{\#}$ is the pseudoinverse of matrix $A_i$.

C. A Second Illustrative Embodiment

A further embodiment of the present invention concerns the use of a set of orthogonal signature sequences to provide a larger set of modified signature sequences in a synchronous case. This larger set may be used to expand the capacity of a DS-CDMA system while maintaining an acceptable level of MAI.

Consider a set of N orthogonal signature sequence symbols, each of length N, denoted as $h_k^n$, k=1,2, ..., N. A set of orthogonal signature sequence signals, $h_k(t)$, may be generated based on $h_k^n$ as follows:

$$h_k(t) = \sum_n h_k^n P_{T_c}(t - nT_c), \quad k = 1, 2, \ldots, N, \tag{31}$$

where $P_{T_c}(t)$ is a rectangular pulse of unit amplitude in the interval $[0, T_c]$, $T_c$ is the duration of a chip of the sequence $h_k^n$, and K is the number of users.

Given $h_k(t)$, each of the users has a signature sequence, $a_k(t)$:

$$a_k(t) = h_k(t)p_1(t) \text{ for } 1 \leq k \leq N; \; a_k(t) = h_{k-N}(t - T_c/2)p_2(t - T_c/2) \text{ for } N < k \leq K, \tag{32}$$

where $p_1(t)$ and $p_2(t)$ are two randomly chosen pseudo-noise waveforms of period $T = NT_c$, and where the total number of system users, K, is greater than N and less than or equal to 2N.

A modified signature sequence for the i th user, $c_i(t)$, may be expressed as a weighted sum of the signature sequences $a_m(t)$ (where subscript m replaces k):

$$c_i(t) = \sum_{m=1}^{M} w_{im} a_m(t), \tag{33}$$

for i=1,2, ..., K, where $W_i = [w_{i1}, w_{i2}, \ldots, w_{iM}]^T$, and where $M (\leq 2N)$ is the number of signature sequences which are used to form the modified signature sequences.

The weight vectors, $W_i$, i=1,2, ..., K, to be used are those which satisfy the error function, $\epsilon''$, discussed above. Given an error vector $V_i$:

$$V_i = AW_i - U_i \tag{34}$$

for i=1,2, ..., K, where $U_i$ is an M×1 unit vector with unity in its i th position and zero elsewhere, and A is a K×M matrix with the lm th element given by $$A_{lm} = \int_0^T a_l(t) a_m(t) dt, \tag{35}$$

then the error function $\epsilon''$ is:

$$\epsilon'' = \sum_{i=1}^{K} \|AW_i - I_i\|^2 + \lambda \sum_{i=1}^{K} W_i^T R W_i, \tag{36}$$

where $$\sum_{i=1}^{K} W_i^T R W_i = \frac{1}{T} \sum_{i=1}^{K} \int_0^T c_i^2(t) dt, \tag{37}$$

and R is an M×M matrix of signature sequence cross-correlations having an lm th element:

$$R_{lm} = \frac{1}{T} \int_0^T a_l(t) a_m(t) dt. \tag{38}$$

Note that the elements of A may be derived by substituting (33) into (8) and factoring out the weights as in (34). For the i th user expression (36) may be written as $$\epsilon_i'' = \|AW_i - I_i\|^2 + \lambda W_i^T R W_i. \tag{39}$$

The value of $W_i$ that minimizes $\epsilon_i''$ is given by $$W_i'' = [A^T A + \lambda R]^{\#} A^T I_i, \tag{40}$$

where # denotes the pseudo-inverse of a matrix. Given $W_i''$, expression (33) may be used to determine the modified sequences $c_i(t)$.

The error function $\epsilon'$ may also be used in this embodiment. In this case the weight vector which minimizes $\epsilon'$ is given by:

$$W_i' = A^{\#} I_i, \tag{41}$$

for i=1,2, ..., K, where $A^{\#}$ is the pseudoinverse of matrix A.

Figure 7:
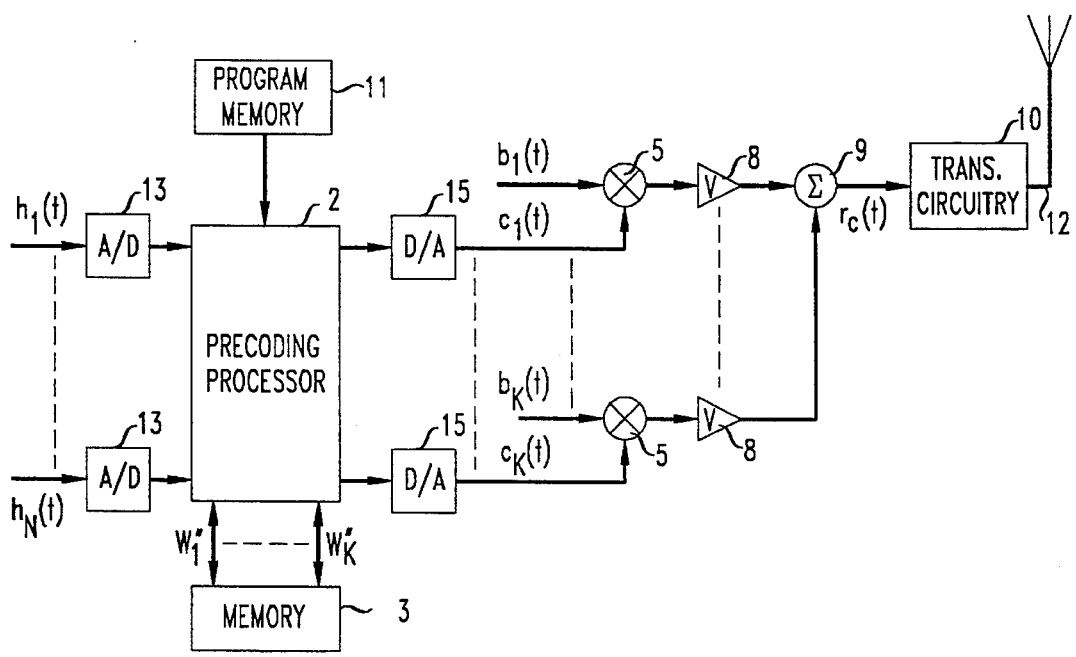
FIG. 7 presents a second illustrative embodiment of the present invention.

FIG. 7 presents the second illustrative embodiment of the present invention. Precoding processor 11 receives orthogonal signature sequence symbols $h_k^n$, $1 \leq k \leq N$, and provides K modified signature sequence symbols, $c_i^n$, $1 \leq i \leq K \leq 2N$, as output to multipliers 5 via D/A converters 15. Processor 11 first determines K signature sequences based on the $h_k(t)$ symbol sequences in accordance with expression (32). Next, processor 11 determines weight vectors $W_i''$ in accordance with expression (40). These weight vectors may be stored in memory 3. Finally, processor 11 determines modified signature sequence symbols $c_i^n(t)$ for each user based on values for $w_i$ and $a_k$ in accordance with expression (33). Alternatively, values for $c_i^n$ may be stored in memory 3 and retrieved by processor 11 as needed for use by multipliers 5. Values for modified sequences $c_i(t)$ are provided to multipliers 5 as appropriate. Software directing the operation of processor 11 in accordance with expressions (32), (40), and (33) is stored in program memory 13. The balance of the embodiment is as discussed above with reference to FIG. 5. A value for scale factor V is obtained according to expression (5).

The noise immunity of the above illustrative embodiments may be enhanced with the use of a channel code incorporated into the precoded DS-CDMA system. The information data signal is encoded before it is spread by the signature sequence.

I claim:

1. A code division multiple access transmitter for transmitting to a plurality of receivers a signal representing a plurality of information signals, the transmitter comprising:

a. two or more means each for applying a signature sequence signal to one of said information signals to form a first signal;

b. means for forming a second signal representing a combination of two or more first signals; and
c. means for transmitting a signal representing the second signal;

wherein signature sequence signals applied to said information signals are based on an error function which reflects correlations between transmitter signature sequence signal variables and signature sequence signals for use by receivers to receive said information signals.

2. The transmitter of claim 1 wherein the error function further reflects an amplitude of the signal transmitted to the plurality of receivers.

3. The transmitter of claim 1 wherein the signature sequence signals for application to said information signals are those which realize an error criterion.

4. The transmitter of claim 3 wherein the error criterion is a substantial minimization of the error function.

5. The transmitter of claim 1 further comprising a plurality of means, each coupled to a means for applying a signature sequence signal, for applying a scale factor to the first signal.

6. The transmitter of claim 1 wherein the correlations comprise weighted sums of correlations of signature sequence signals for use by receivers to receive said information signals.

7. The transmitter of claim I wherein the signature sequence signals for application to said information signals and the signature sequence signals for use by receivers are based on a set of orthogonal sequence signals.

8. The transmitter of claim 7 wherein the number of orthogonal sequence signals is less than either the number of signature sequence signals for application to said information signals or the number of signature sequence signals for use by receivers.

9. A signal generator for providing signature sequence signals for use by a code division multiple access transmitter in transmitting a signal to one or more receivers, the signal generator comprising:

a memory storing first signature sequence signals, wherein the first signature sequence signals correspond to signature sequence signals for use by receivers to receive transmitted signals; and means, coupled to the memory, for forming second signature sequence signals based on an error function, said error function reflecting correlations between said second signature sequence signal variables and said first signature sequence signals stored in said memory.

10. The signal generator of claim 9 wherein the error function further reflects an amplitude of the signal transmitted to one or more receivers.

11. The signal generator of claim 9 wherein the second signature sequence signals based on the error function realize an error criterion.

12. The signal generator of claim 11 wherein the error criterion is a substantial minimization of the error function.

13. The signal generator of claim 9 wherein the correlations comprise a weighted sum of correlations of first signature sequence signals.

14. The signal generator of claim 9 wherein the second signature sequence signals and the first signature sequence signals are based on a set of orthogonal sequence signals.

15. The signal generator of claim 14 wherein the number of orthogonal sequence signals is less than either the number of second signature sequence signals or the number of first signature sequence signals.

16. A method of transmitting to a plurality of receivers in a code division multiple access system a signal representing a plurality of information signals, the method comprising:
a. for each of two or more receivers which is to receive one of said information signals, applying a signature sequence signal to said one information signal to form a first signal;
b. forming a second signal representing a combination of one or more first signals; and
c. transmitting a signal representing the second signal;

wherein signature sequence signals applied to said information signals are based on an error function which reflects correlations between transmitter signature sequence signal variables and signature sequence signals for use by receivers to receive said information signals.

17. The method of claim 16 wherein the error function further reflects an amplitude of the signal transmitted to the one or more receivers.

18. The method of claim 16 wherein the signature sequence signals for application to said information signals are those which realize an error criterion.

19. The method of claim 18 wherein the error criterion is a substantial minimization of the error function.

20. The method of claim 16 further comprising the step of applying a scale factor to the first signal.

21. The method of claim 16 wherein the correlations comprise weighted sums of correlations of signature sequence signals for use by receivers to receive said information signals.

22. The method of claim 16 wherein the signature sequence signals for application to said information signals and the signature sequence signals for use by receivers are based on a set of orthogonal sequence signals.

23. The method of claim 22 wherein the number of orthogonal sequence signals is less than either the number of signature sequence signals for application to said information signals or the number of signature sequence signals for use by receivers.

* * * * *